United States Patent [19]

Carr et al.

[11] Patent Number: 4,638,236
[45] Date of Patent: Jan. 20, 1987

[54] DC TO DC BATTERY CHARGER

[75] Inventors: Francis L. Carr, Downers Grove; Larry R. Terrill, Bloomingdale, both of Ill.

[73] Assignee: A. G. Busch & Co., Inc., Chicago, Ill.

[21] Appl. No.: 669,663

[22] Filed: Nov. 8, 1984

[51] Int. Cl.[4] .............................. H02J 7/00
[52] U.S. Cl. ................................ 320/21; 320/2
[58] Field of Search ...................... 320/2–5, 320/20, 21, 19; 363/26

[56] References Cited

U.S. PATENT DOCUMENTS

| | | | |
|---|---|---|---|
| 2,979,607 | 4/1961 | Herzfeld | 250/6 |
| 3,309,598 | 3/1967 | Montgomery et al. | 320/2 |
| 3,426,263 | 2/1969 | Hennigan et al. | 320/21 |
| 3,466,453 | 9/1969 | Greenberg | 307/10 |
| 3,594,627 | 7/1971 | Lesher | 320/21 |
| 3,838,327 | 9/1974 | Uemichi et al. | 320/2 |
| 4,048,551 | 9/1977 | Bosik | 320/21 |
| 4,052,656 | 10/1977 | Lavell et al. | 320/23 |
| 4,092,580 | 5/1978 | Prinsze | 320/2 |
| 4,109,193 | 8/1978 | Schultheis | 320/23 |
| 4,122,514 | 10/1978 | Amin | 363/26 X |
| 4,179,648 | 12/1979 | Samsioe | 320/11 |
| 4,224,658 | 9/1980 | Siiberg | 362/183 |
| 4,258,305 | 3/1981 | Anglin | 320/2 |
| 4,274,044 | 6/1981 | Barre | 320/21 |
| 4,327,401 | 4/1982 | Siiberg | 362/183 |
| 4,355,275 | 10/1982 | Anglin | 320/21 |

FOREIGN PATENT DOCUMENTS 2492182  4/1982  France ................ 320/21

OTHER PUBLICATIONS

"Battery Charger for Portable Video", Pawson, Television, vol. 30, No. 3, Jan./1980, pp. 142-143.
"PWM Battery Charger", Dhingra, Elektor, Jul.-Aug./1980, pp. 7-18.

Primary Examiner—R. J. Hickey
Attorney, Agent, or Firm—Gerald M. Newman

[57] ABSTRACT

A battery charger adapted for connection to a standard 12 volt vehicle battery through a cigarette lighter socket includes a transistorized saturable-transformer DC to AC inverter and an AC to DC rectifier for generating a potential higher than the potential from said 12 volt vehicle battery. An integrated circuit pulse width modulated current control is used to control charging current flow to a second battery to be charged and to maintain charging current at a safe level.

1 Claim, 1 Drawing Figure

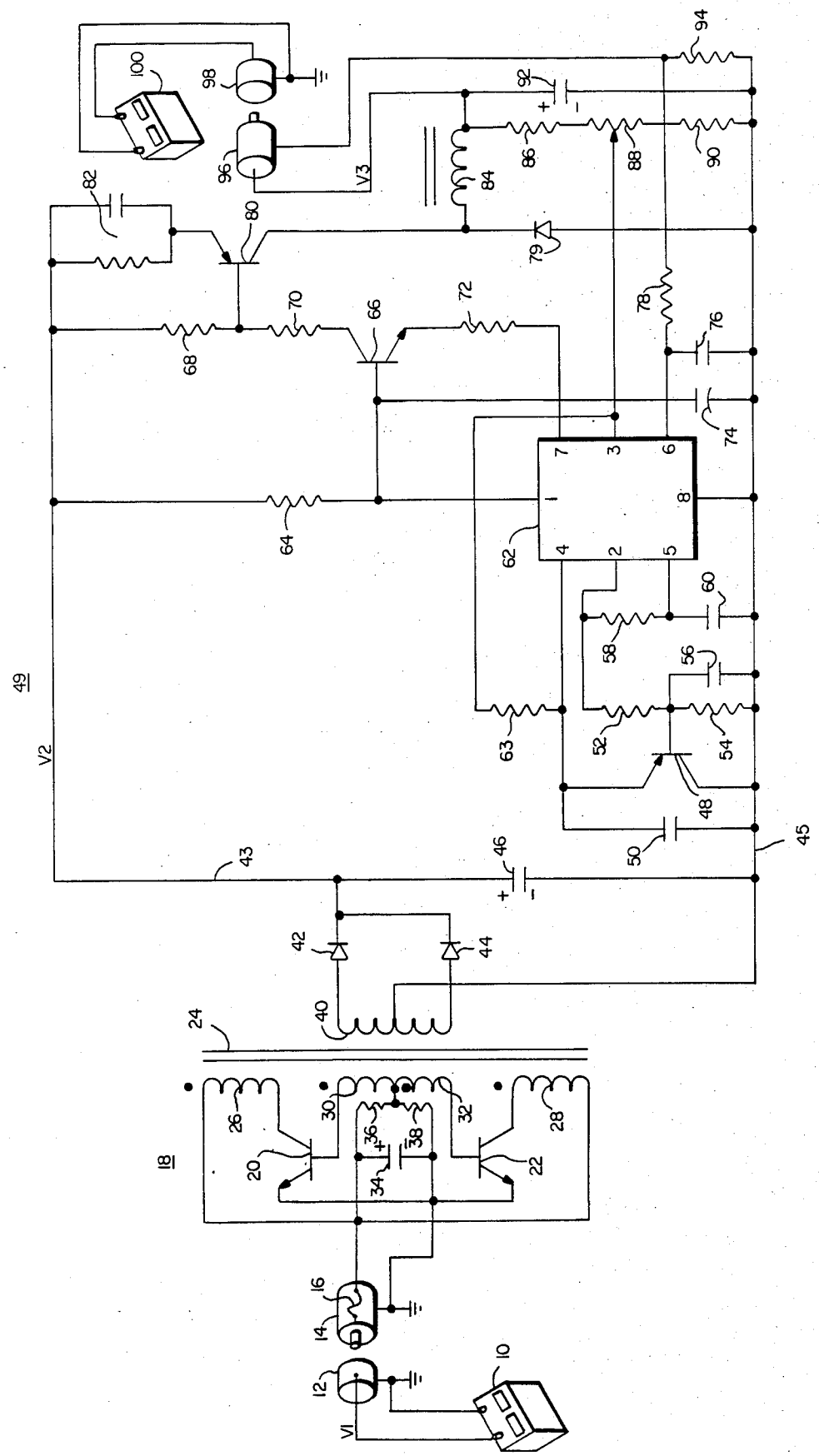

DC TO DC BATTERY CHARGER

BACKGROUND OF THE INVENTION

This invention relates generally to battery chargers and specifically to battery chargers for charging a battery or a battery pack from a conventional 12 volt automobile battery.

There are many well-known battery chargers in use, including those that operate by plugging into the cigarette lighter of an automobile, or other suitably equipped vehicle, and drawing power from the vehicle battery for either charging another automobile battery in a lesser state of charge or for recharging other type batteries such as battery packs for portable battery-operated equipment. Many of those chargers include a series-connected current limiting means for restricting current flow to the battery under charge.

It is well known that for proper battery charging the charging current must be conditioned, i.e., a large initial charging current is required, followed by a gradually lowering current as the internal voltage of the charged battery rises in response to increases in its charge level. To provide such conditioned current flow to the battery under charge, the circuit of the invention includes means for conditioning the input voltage to elevate it to a potential above that required for charging the battery and output voltage regulation means for controlling current flow to the battery.

OBJECTS OF THE INVENTION

The principal object of this invention is to provide a novel battery charging circuit.

A further object of this invention is to provide a battery charger that is operable from a vehicle battery for charging a battery in accordance with its design charge rate characteristic.

SUMMARY OF THE INVENTION

In accordance with the invention, a DC-DC battery charger comprises means for making electrical connections to a first battery, means for making electrical connections to a second battery to be charged, means for raising the voltage from the first battery to a level above that of the second battery and means for conditioning current flow to the second battery to limit charging currents thereto to a safe value.

BRIEF DESCRIPTION OF THE DRAWINGS

Further objects and advantages of the invention will be apparent upon reading the following description in conjunction with the drawing, the single FIGURE of which is a schematic diagram of a circuit constructed in accordance with the invention.

DESCRIPTION OF THE PREFERRED EMBODIMENT

Referring to the drawing, a battery 10 which may be a conventional 12 volt automotive battery, is connected to a female receptacle or socket 12 which may comprise a typical automotive cigarette lighter socket. The voltage of battery 10 is indicated as V1 and will normally be in the range of 11 volts to 15 volts D.C., depending upon the state of charge of the battery. A conventional adapter plug 14 for use with a cigarette lighter socket includes a center lead having a fuse 16 serially connected therein and is arranged to make suitable electrical connections to the positive and negative terminals of battery 20 via receptacle 12. Input voltage conditioning means, generally indicated by reference numeral 18, comprise a DC to AC inverter. It includes a saturable transformer core 24 having a plurality of windings 26, 28, 30 and 32 wound thereon and a pair of NPN type transistors 20 and 22 coupled in a conventional arrangement for providing a "chopped" DC current flow when connected to battery 10. Specifically, the positive and negative leads from plug 14 are connected across an electrolytic filter capacitor 34 and across a series-connected pair of resistors 36 and 38. The junction of resistors 36 and 38 is connected to the junction of windings 30 and 32. The windings are poled, as indicated by the dots adjacent to their end terminals, to show the relative direction of voltage change in the windings at any time.

Windings 30 and 32 are connected to the base electrodes of transistors 20 and 22, respectively, the emitters of which are connected to ground. The collector electrodes of transistors 20 and 22 are connected to windings 26 and 28 respectively, the other ends of which are connected to fuse 16 in the positive lead of plug 14. The operation of input voltage conditioning means 28 in alternately switching transistors 20 and 22 conductive and non-conductive as transformer core 24 saturates to produce a chopped DC current in the transformer from the direct current input from battery 10 is well known in the art and will not be discussed in detail.

A center tapped secondary winding 40 has its ends connected to the anodes of a pair of diodes 42 and 44, the cathodes of which are connected together and to a filter capacitor 46, the other terminal of which is returned to the center tap. In accordance with the preferred form of the invention, the A.C. voltage generated across winding 40 is of sufficient magnitude, after being rectified and filtered, to produce a voltage V2 that is greater than voltage V1 from battery 10 and generally greater than a voltage V3 required to supply adequate charging current to the battery to be charged. It will be appreciated that the circuit of the invention may be configured to charge batteries of lower potential than conventional 12 volt vehicle batteries, with the relationship between V1, V2 and V3 differing accordingly. The preferred use of the invention is to charge a 12 volt or higher voltage battery from a conventional 12 volt vehicle battery.

The output regulator control means, generally designated by reference numeral 49, is centered around an integrated circuit (IC) pulse width modulator control circuit 62. The IC is obtainable from Sprague Electric Company of North Adams, Mass. under the designation ULN-8161 and is identified as a switched-mode power supply control circuit. The pin numbers identified on the drawing correspond to those on the IC device. Operating voltage is supplied to pin 1 of IC 62 from V2 through a current limiting resistor 64. A filter capacitor 74 is connected from pin 1 to the common return line 45. IC 62 includes an internal sawtooth oscillator having an operating frequency determined by a resistor 58, connected between pins 2 and 5, and a capacitor 60, connected between pin 5 and return line 45.

Output pulses from the IC are provided at pin 7. Their maximum duty cycle is determined by an NPN transistor 48 having its emitter electrode connected to pin 4 and its collector electrode connected to return line 45. A pair of resistors 52 and 54, serially connected between pin 2 and return line 45, have their junction connected to the base electrode of transistor 48. The ratio of these resistors determine the maximum duty cycle of the output pulses by controlling conduction in transistor 48. Capacitor 56, coupled from the base of transistor 48 to return line 45, assures that IC 62 always begins with a 0% duty cycle and increases to its maximum duty cycle as the capacitor is charged.

Output pulses from pin 7 of IC 62 are supplied through a resistor 72 to the emitter electrode of an NPN transistor 66, the base electrode of which is connected to pin 2. The collector electrode of transistor 66 is connected to potential V2 through a series connection of a pair of resistors 68 and 70. Thus transistor 66 is a common base amplifier for amplifying output pulses from pin 7 of IC 62. The junction of resistors 68 and 70 is connected to the base electrode of an NPN transistor 80, which is driven conductive by the output current pulses. The emitter electrode of transistor 80 is connected through a bias and filter network 82 to V2 and its collector electrode is connected to a choke coil 84 and the cathode of a diode 79, the anode of which is connected to return line 45.

It will be appreciated by those skilled in the art that resistors 64 and 72 and transistor 66 enable use of a larger supply potential to IC 62 than the IC is capable of normally withstanding. Resistor 68 and network 82 provide bias and high frequency compensation for transistor 80. The current pulses from IC 62 at the base of transistor 80 permit large current flow as follows: from V2, through the emitter-collector path of transistor 80, through choke coil 84 and through a large filter capacitor 92 to return line 45. Each current pulse develops a magnetic field around choke coil 84 and, when the current pulse terminates, transistors 66 and 80 are rendered non-conductive to terminate current flow to choke coil 84. This collapses the magnetic field of choke coil 84 and reverses the voltage across its terminals. Choke coil 84 now becomes a source of current for continuing the charging of capacitor 92 through diode 79 and voltage V3 is developed across capacitor 92.

A suitable plug 96 is provided for delivering output current to a battery 100 to be charged by means of a mating receptacle 98. The positive lead of plug 96 is connected to the positive terminal of capacitor 92 and the negative lead of the plug is connected to the other terminal of capacitor 92 through a resistor 94. The voltage developed across resistor 94 is fed back to pin 6 of IC 62 through a resistor 94. The voltage developed across resistor 94 is fed back to pin 6 of IC 62 through a resistor 78, which is bypassed to return line 45 through a filter capacitor 76. The potential at pin 6 of IC 62 is compared with a voltage generated within the IC and results in the output pulses at pin 7 becoming narrower and limiting the current available from the output terminal during battery charging operations.

The terminal voltage of battery 100 appears across the voltage divider consisting of series connected resistors 86 and 90 and potentiometer 88, which are provided for temperature compensation. The slider on potentiometer 88 is connected to pin 3 of IC 62 and the voltage applied to the pin is compared with an internally generated sawtooth voltage waveform to further narrow the output pulses on pin 7 and reduce current flow to a safe limit for the battery under charge. Finally, the connection between pin 3 of the IC, through resistor 63 and capacitor 50, to return line 45 controls the sharpness of the voltage cutoff in accordance with the values selected for these components.

It will be appreciated by those skilled in the art that the particular values of components used will vary with the type of battery to be recharged and the voltage and current characteristics thereof as well as with the type of battery supplying the charging current. As mentioned, the preferred embodiment envisions charging from a conventional 12 volt vehicle battery. With the circuit of the invention, batteries of much higher voltage may be safely recharged.

It is recognized that numerous modifications and changes in the described embodiment of the invention will be apparent to those skilled in the art without departing from the true spirit and scope thereof. The invention is to be limited only as defined in the claim.

What is claimed is:

1. A DC to DC battery charger for a vehicle comprising:
   adapter plug means for making electrical connections to a first battery through a cigarette lighter socket in said vehicle;
   means for making electrical connections to a second battery to be charged;
   a DC to AC converter and an AC to DC rectifier for elevating the voltage from said first battery to a voltage above that of said second battery;
   integrated circuit means for generating a pulse width modulated current as a function of the charged condition of said second battery;
   transistor switch means supplied with said pulse width modulated current for developing a charging voltage;
   a choke coil and a capacitor serially connected to said transistor switch means; and
   a diode connected across said choke coil and said capacitor whereby said capacitor is charged during pulses of current from said transistor switch means through said choke coil, said choke coil reversing polarity at the termination of said pulses of current and continuing to charge said battery through said diode, said DC rectified voltage being controlled by said integrated circuit means for regulating current through said choke coil.

* * * * *